United States Patent [19]

Hayes

[11] Patent Number: 4,965,805
[45] Date of Patent: Oct. 23, 1990

[54] DITHER-FREE ACTIVELY STABILIZED LASER

[75] Inventor: Cecil L. Hayes, Placentia, Calif.

[73] Assignee: Rockwell International Corporation, El Segundo, Calif.

[21] Appl. No.: 402,284

[22] Filed: Sep. 5, 1989

[51] Int. Cl.[5] .............................................. H01S 3/10
[52] U.S. Cl. ........................................ 372/32; 372/20
[58] Field of Search ............................. 372/32, 29, 20

[56] References Cited

U.S. PATENT DOCUMENTS

| | | | |
|---|---|---|---|
| 3,766,466 | 10/1916 | Faries et al. | 331/94.5 |
| 3,928,814 | 12/1975 | Feichtner | 372/20 |
| 3,996,525 | 12/1976 | Hughes et al. | 372/20 |
| 4,118,675 | 10/1978 | Rahn et al. | 372/20 |
| 4,338,578 | 7/1982 | Sukhman | 372/23 |
| 4,398,293 | 8/1983 | Hall et al. | 372/32 |
| 4,412,330 | 10/1983 | Mauck et al. | 372/29 |
| 4,660,206 | 4/1987 | Halmos et al. | 372/28 |
| 4,685,111 | 8/1987 | Baer | 372/18 |
| 4,815,085 | 3/1989 | Javan | 372/32 |
| 4,817,101 | 3/1989 | Wyeth et al. | 372/32 |

*Primary Examiner*—James W. Davie
*Attorney, Agent, or Firm*—H. Fredrick Hamann; George A. Montanye; Tom Streeter

[57] ABSTRACT

A pair of single mode laser light sources are tuned to opposite sides of a frequency response curve which forms either a peak or a valley. The laser light sources are offset in frequency from each other by a fixed frequency interval. The average frequency may thus be stabilized at the peak or valley. A third single mode laser light source, offset in frequency at a fixed point between the frequencies of the pair of laser sources, may thus be actively stabilized at the peak or valley. The frequency spectrum is simple, and of high power.

16 Claims, 8 Drawing Sheets

DITHER-FREE ACTIVELY STABILIZED LASER

BACKGROUND OF THE INVENTION

This invention relates to actively stabilized lasers, and has particular application to lasers which avoid the use of dithering for frequency stabilization.

Lasers have a gain medium contained between a pair of mirrors. The lasing medium will sustain oscillations over only a narrow band of frequencies, producing considerable power at a central peak frequency, and dropping off in power production as the sides of the band are approached. The mirrors are spaced so that the optical length between them is an integral multiple of half wavelengths of the light of desired frequency. As this optical length drifts with age, temperature fluctuations, acoustics, vibrations, and the like, the frequency of the light produced by the laser drifts with it. If the laser is originally tuned to the peak frequency, this drift from the peak frequency results in reduced power. Further, if the laser is used to measure a distance or other parameter, this drift may cause measurement errors.

Passive stabilization—shock protection, constant temperature maintenance, and the like—can do only so much. Workers have therefore developed two forms of active stabilization.

For the first form of active stabilization, the lasing material is modified (as by applying a magnetic field to it, for Zeeman splitting), so as to have two separate modes of operation, separately detectable, with separate peak frequencies, and separate (but overlapping) frequency bands. The optical length is set so that the operating frequency is lower than the higher mode peak frequency, and higher than the lower mode peak frequency. As the operating frequency drifts, the ratio of the power produced in the high frequency mode to the power produced in the low frequency mode changes. This change in power ratio is detected, and the optical length is adjusted to restore the ratio to the desired valve. This restores the operating frequency to the desired value as well.

The second form of active stabilization is dithering. The frequency is deliberately changed—dithered—in a periodic manner, causing a concurrent fluctuation in the power output. If the operating frequency is above the peak frequency, then increasing the operating frequency will decrease the power output. Therefore, the power output fluctuation will be at the same frequency as, and a half cycle out of phase with, the frequency dither. Likewise, if the operating frequency is below the peak frequency, then increasing the operating frequency will increase the power output. Therefore, the power output fluctuation will be at the same frequency as, and in phase with, the frequency dither.

If the operating frequency is at the peak frequency, then power will be reduced whether the operating frequency is increased or decreased. Therefore, the power output fluctuation will be at twice the frequency of the frequency dither, and will give the appearance of inverted full wave rectification. When this second harmonic predominates over the first harmonic, operation is at (or near) peak frequency. The operating frequency is servo controlled to maximize the second harmonic, and minimize the first harmonic, of the dither frequency.

SUMMARY OF THE INVENTION

It is thus seen that active stabilization has heretofore involved deliberately producing complex output radiation over a range of frequencies substantially different from the peak frequency. It is an objective of the present invention to simplify and stabilize the frequency spectrum produced by a laser, thereby reducing measurement errors. It is a further objective of the present invention to maximize the power output.

These objectives are accomplished by using single mode lasers only, and by offsetting the frequencies of a pair of laser beams by a fixed frequency interval from each other, each beam being on the opposite side of a gain peak or valley.

In accordance with the present invention, an actively stabilized laser light source comprises a higher frequency single mode laser light source, a lower frequency single mode laser light source, and means for increasing and decreasing the frequencies of these single mode sources.

The higher frequency single mode laser light source is tuned to a higher output frequency than the center frequency of the response curve.

The lower frequency single mode laser light source is tuned to a lower output frequency than the center frequency of the response curve. The higher output frequency differs from the lower output frequency by an at least approximately fixed frequency difference.

The means for increasing and decreasing the frequency is responsive to a power difference. This power difference may be a difference between the actual power of the single mode sources, or it may be a difference between monotonic functions of the power of the sources, such as the logarithm of the power (ratio) of the sources. The means increases the higher and lower output frequencies when the power difference has a first sign, and decreases the frequencies of the sources when the power difference has a second sign, opposite to the first sign.

In all embodiments of the present invention, if the first sign is positive and the second sign is negative, then the invention is operating on a gain line. If the first sign is negative and the second sign is positive, then the invention is operating on an absorption line.

In one embodiment, the higher frequency single mode laser light source comprises a higher frequency laser, and the lower frequency single mode laser light source comprises a lower frequency laser.

In another embodiment, the actively stabilized laser light source comprises a single mode laser, a frequency shifter, and a means for increasing or decreasing the frequency of the laser.

The single mode laser produces a first output beam which has a first output frequency and which passes through a first gain cell. The first gain cell has a first power-to-frequency response curve having a first center frequency. The first output frequency is on a first side of (either above or below) the first center frequency.

The frequency shifter is driven by a portion of the first output beam and produces a second output beam. The second output beam has a second output frequency and passes through a second gain cell having a second power-to-frequency response curve. The second power-to-frequency response curve is at least approximately identical to the first power-to-frequency response curve. It has a second center frequency, and the second output frequency is on a second side of (either below or above) the second center frequency, that is, opposite to the first side. The second output frequency differs from the first output frequency by an at least approximately fixed frequency difference.

The frequency increasing and decreasing means of this embodiment is essentially similar to that of the first embodiment, except that it is driven by the outputs of the gain cells rather than the outputs of the lasers.

Conceptually, the first gain cell may be different from the second gain cell, and share only a power-to-frequency response curve. In practice, it is preferred that the first gain cell be the same as the second gain cell.

In a third embodiment, the actively stabilized laser light source further comprises an intermediate frequency single mode laser light source. This intermediate source has an intermediate output frequency between the higher output frequency and the lower output frequency. This intermediate output frequency differs from the higher output frequency (or from the lower output frequency) by an at least approximately fixed frequency difference.

In this embodiment, it is preferred that the intermediate frequency single mode laser light source itself have an intermediate power-to-frequency response curve, and that the intermediate frequency be at least approximately the same as a center frequency of the intermediate power-to-frequency response curve.

Active stabilization may be accomplished (if the intermediate frequency single mode laser light source comprises a laser having an optical length) by modulating the optical length of the laser. Alternatively, active stabilization may be accomplished by means, external to the laser, for stabilizing the intermediate frequency by frequency modulating an output beam produced by the laser. This stabilizing means preferably comprises an acousto-optical cell.

DETAILED DESCRIPTION OF A PREFERRED EMBODIMENT

Figure 1:
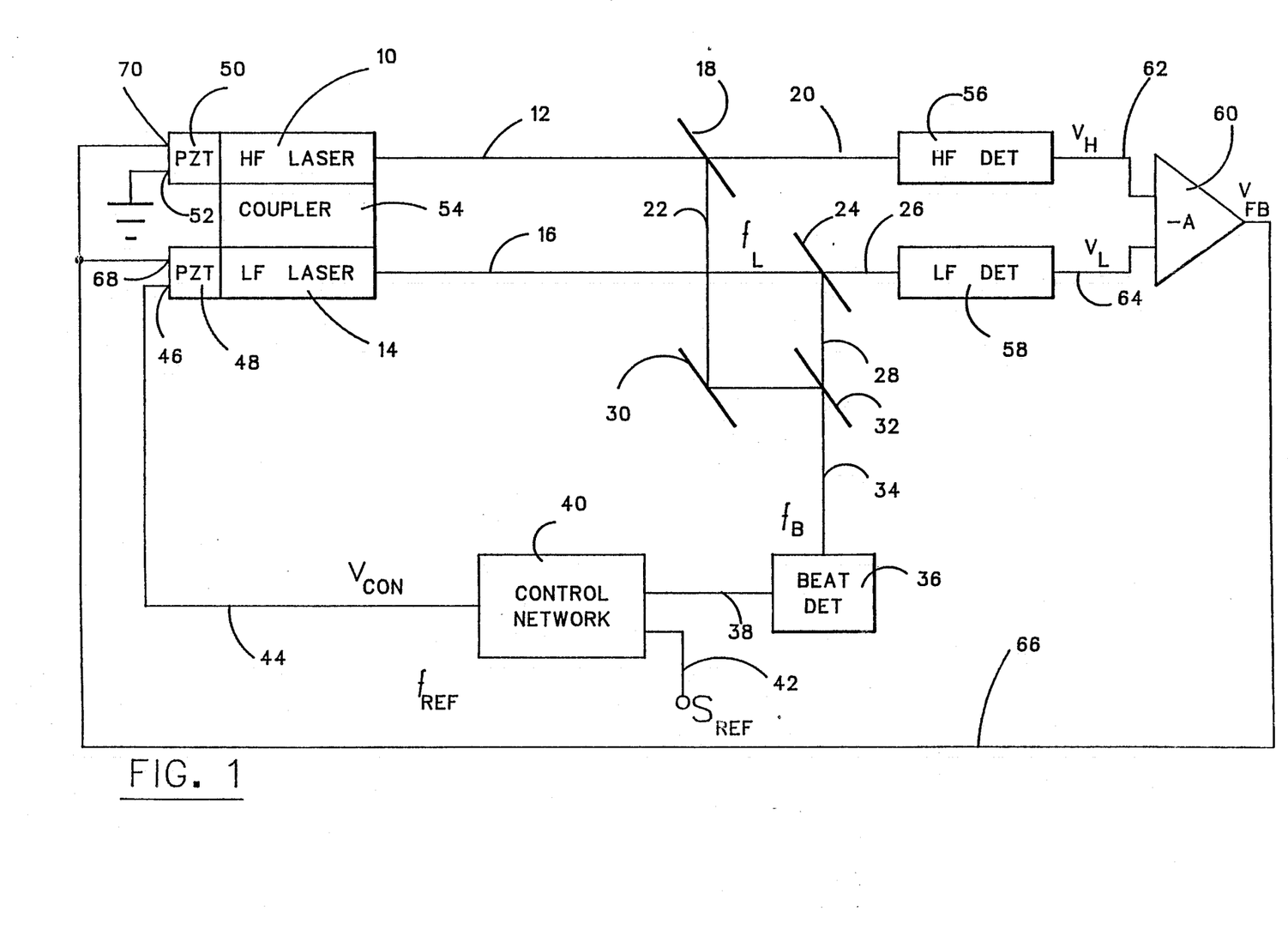
FIG. 1 is a schematic view of a dual laser embodiment of the present invention.

Turning now to FIG. 1, a higher frequency laser 10 produces a higher frequency beam of light 12, while a lower frequency laser 14 produces a lower frequency beam of light 16. The higher frequency beam 12 strikes a first beam splitter 18, and divides into a higher frequency transmitted portion 20 and a higher frequency reflected portion 22. The lower frequency beam 16 strikes a second beam splitter 24, and divides into a lower frequency transmitted portion 26 and a lower frequency reflected portion 28.

Either (as shown) the higher frequency reflected beam 22 or the lower frequency reflected beam 28 is reflected off an alignment mirror 30. The reflected beams 22 and 28 strike opposite sides of a combining mirror 32, and combine into a combined beam of light 34.

The combined beam 34 impinges upon a beat detector 36, which produces a signal S corresponding to the beat frequency of the combined beam 34. Signal S is transmitted on a conductor 38 to a control network 40. The control network 40 compares the signal S with a reference signal $S_{REF}$, which it receives on a conductor 42. It produces a control voltage $V_{CON}$ which it transmits through a conductor 44 to a first terminal 46 of a lower frequency piezoelectric transducer 48, which controls the length of lower frequency laser 14. The length of the higher frequency laser 10 is controlled by a similar higher frequency piezoelectric crystal 50, which has a similar first terminal 52, which can be grounded.

The beat frequency $f_B$ is stabilized by the foregoing apparatus to a reference frequency $f_{REF}$, determined by the reference signal $S_{REF}$. If the beat frequency $f_B$ drifts upward, this indicates that the higher frequency $f_H$ of the higher frequency beam 12, and the lower frequency $f_L$ of the lower frequency beam 16, are drifting apart. The signal S drifts upward with it, and begins to differ from the reference signal $S_{REF}$.

At this point, the control voltage $V_{CON}$ starts to go negative, and the lower frequency piezoelectric crystal 48 gets longer. This shortens the optical length of the lower frequency laser 14, which drives its frequency up, i.e., toward the frequency of the higher frequency laser 10. This reduces the beat frequency $f_B$ and therefore changes the signal S, causing the lower frequency piezoelectric crystal 48 to stop getting longer and the frequency of the lower frequency laser 14 to stop getting higher.

It is apparent that similar apparatus could be used to reduce the frequency of the higher frequency laser 10 instead of, or in addition to, the foregoing apparatus controlling the optical length of the lower frequency laser 14. A coupler 54 between the higher frequency laser 10 and the lower frequency laser 14 may passively assure such a commonality of temperature, pressure, power supply, and the like as to assist active stabilization of the beat frequency $f_B$, but purely passive stabilization of the beat frequency $f_B$ has been found to be unsatisfactory.

It is also apparent that apparatus for stabilizing the difference in frequencies between the lasers will not stabilize the average frequency of the two lasers, $f_{AVG} = (f_L + f_H)/2$. Accordingly, a higher frequency detector 56 detects the power of the transmitted portion 20 of the higher frequency beam 12, and a lower frequency detector 58 detects the power of the transmitted portion 26 of the lower frequency beam 16. Both detectors 56 and 58 are preferably baseband detectors.

The higher frequency detector 56 produces a higher frequency voltage $V_H$ proportional to the power of the higher frequency transmitted portion 20, and the lower frequency detector 58 produces a lower frequency voltage $V_L$ proportional to the power of the transmitted portion 26 of the lower frequency beam 16. The higher frequency voltage $V_H$ is transmitted to one input terminal of an output differential amplifier 60 on a conductor 62. The lower frequency voltage $V_L$ is transmitted to the other input terminal of the differential amplifier 60 on a conductor 64. The feedback voltage $V_{FB}$ produced by the differential amplifier 60 is transmitted on a conductor 66 to a second terminal 68 of the lower frequency piezoelectric transducer 48, and to a second terminal 70 of the higher frequency piezoelectric transducer 50.

Figure 2:
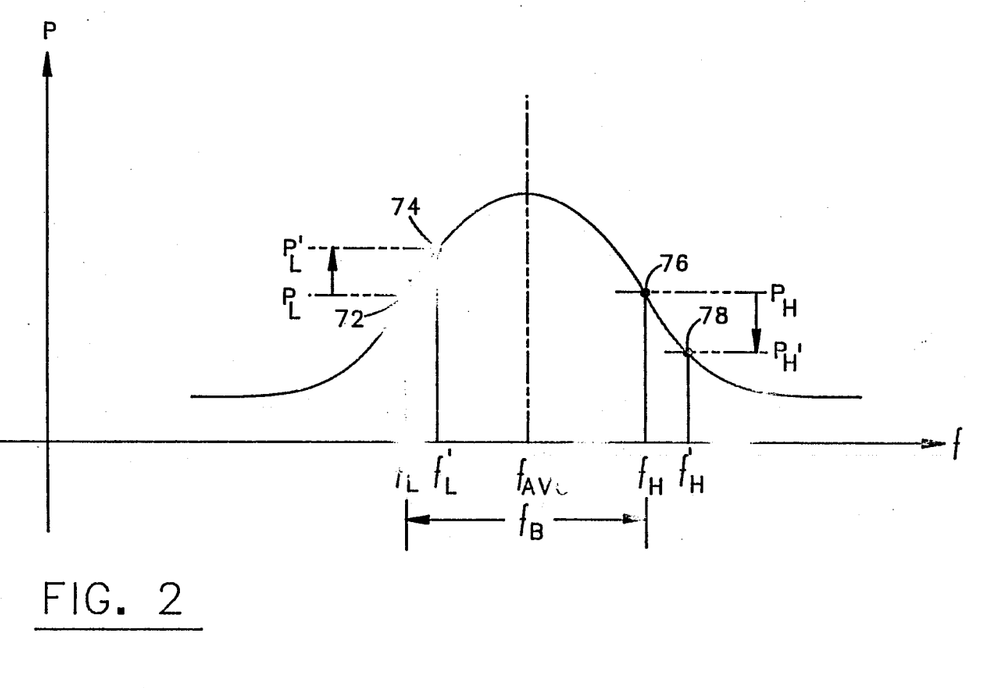
FIG. 2 is an exemplary graph of power versus frequency, showing the operation of the apparatus of FIG. 1.

The operation of the above described feedback loop is best understood with reference to FIG. 2. As has been shown above, $f_H$ and $f_L$ are stabilized to being separated by a fixed beat frequency $f_B$. They either drift up in frequency together or drift down together. Suppose that they drift up together, with $f_L$ increasing to $f_L'$, and $f_H$ increasing to $f_H'$. Then the power of the lower frequency laser 14 increases from $P_L$ to $P_L'$; that is, its operating point moves from reference point 72 to reference point 74. Likewise, the power of the higher frequency laser 10 decreases from $P_H$ to $P_H'$; that is, its operating point moves from reference point 76 to reference point 78.

This shifting of operating points causes $V_L$ to increase and $V_H$ to decrease, so the feedback voltage $V_{FB}$ starts to go negative. This decreases the length of both piezoelectric crystals 48 and 50, which increases the optical length of both lasers 10 and 14, which reduces both $f_H$ and $f_L$. This reduces $V_L$ and increases $V_H$, which drives $V_{FB}$ back toward zero, which causes both piezoelectric crystals 48 and 50 to stop getting shorter, which causes both $f_H$ and $f_L$ to stop getting smaller.

Alternatively, the second terminal 68 of the lower frequency piezoelectric transducer 48 is also grounded. When this configuration is selected, only the higher frequency laser 10 is directly stabilized to a particular point on its gain curve. The lower frequency laser 14 is only indirectly stabilized, since the beat detector 36 and control network 40 keep its frequency at a fixed offset from the frequency of the higher frequency laser 10. This configuration is actually preferred, since the lower frequency piezoelectric transducer 48 is thus required to respond only to one signal, rather than two.

It is apparent that the active stabilization of the beat frequency $f_B$ and the active stabilization of the average frequency $f_{AVG}$ are independent, and could be accomplished with separate piezoelectric transducers. It is also apparent that other means for servoing the frequency of the lasers 10 and 14 could be used, such as an acousto-optical cell, an electro-optical cell, or the like. Indeed, applicant prefers to use an electro-optical cell to stabilize the average frequency $f_{AVG}$, and a piezoelectric crystal to stabilize the beat frequency $f_B$.

Figure 3:
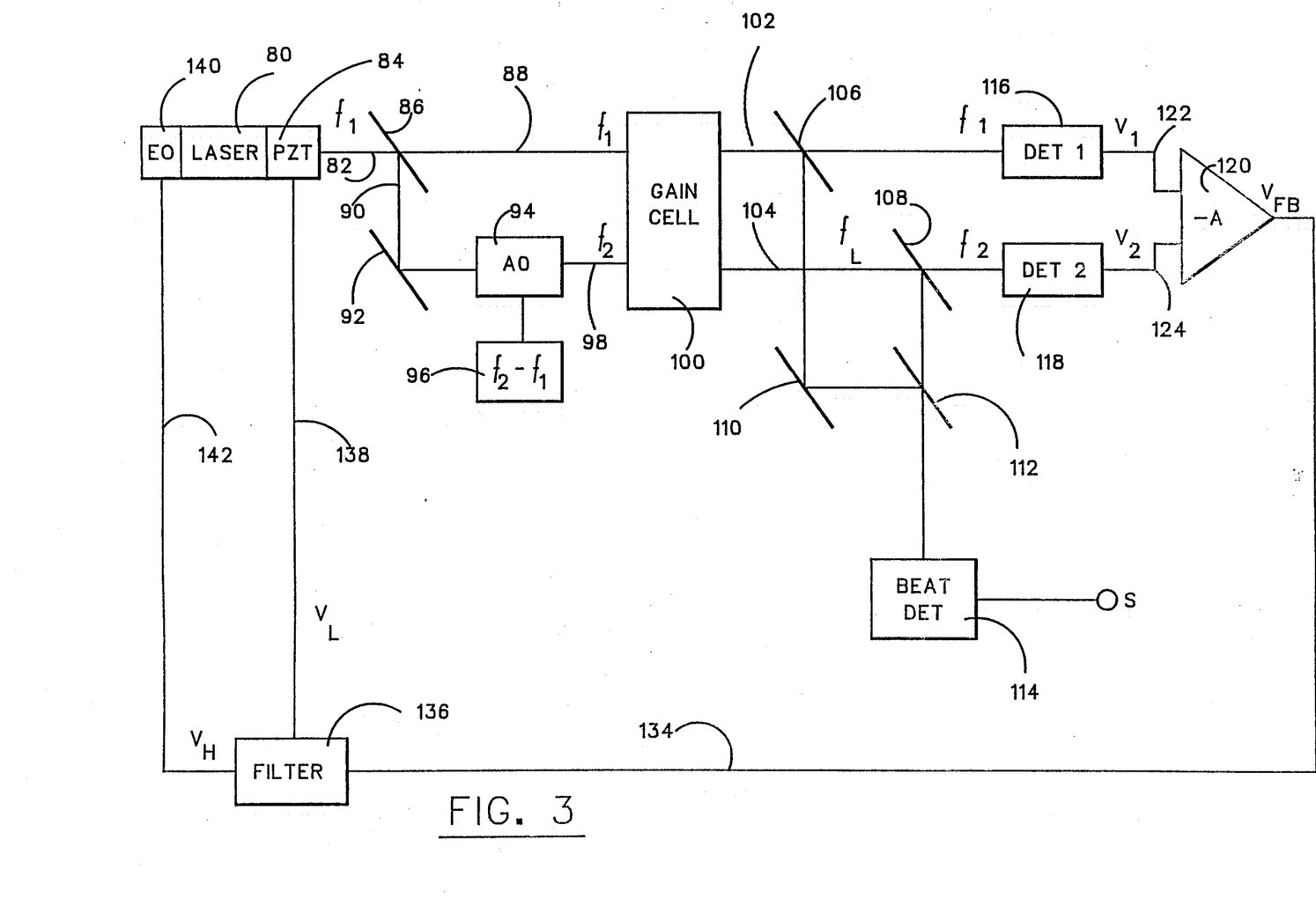
FIG. 3 is a schematic view of a single laser, single frequency shifter embodiment of the present invention.

A second embodiment of the present invention is shown in FIG. 3. A laser 80 passes light 82, having frequency $f_1$ through a piezoelectric driven output coupler 84. It is divided by a beam splitter 86 into a transmitted beam 88 and a reflected beam 90, which, after reflecting from mirror 92, enters a frequency shifter, such as acousto-optical cell 94. The acousto-optical cell 94 is driven by an acoustic source 96, having a frequency $f_2-f_1$. The acousto-optical cell accordingly provides a beam of light 96 having a frequency $f_2$.

The beams 88 and 98 enter a gain cell 100, and emerge, respectively, as beams 102 (of frequency $f_1$) and 104 (of frequency $f_2$). The beams 102 and 104 may be sampled by beam splitters 106 and 108, reflected to a common location by mirror 110, and be recombined by beam splitter 112; and the resulting beat frequency may be detected by a beat detector 114, and a signal S produced, all as in FIG. 1. The signal S of FIG. 3 is, however, used only to assure that beams 102 and 104 have been properly produced. Signal S of FIG. 3 forms no essential part in their production, in contrast to the role played by S in forming beams 12 and 16 of FIG. 1.

Beams 102 and 104 enter, respectively, detectors 116 and 118 (again, preferably baseband detectors), the outputs of which are fed to a differential amplifier 120 via conductors 122 and 124, respectively. The differential amplifier 120 produces a feedback voltage $V_{FB}$, which is returned to the laser 80 to stabilize it.

Figure 4:
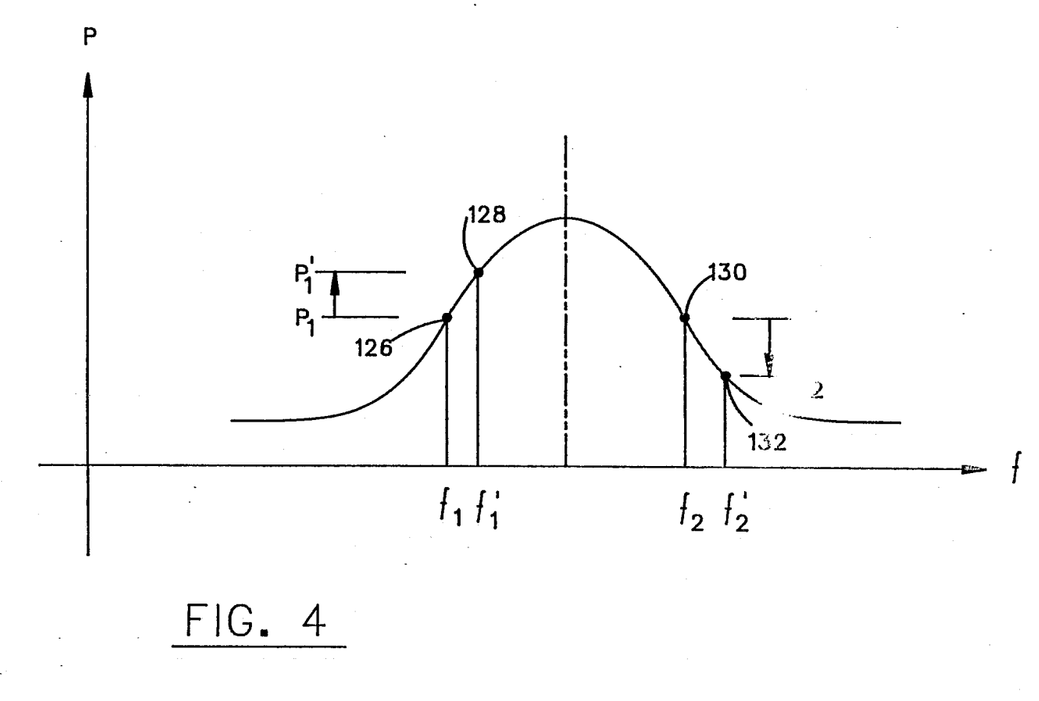
FIG. 4 is an exemplary graph of power versus frequency, showing the operation of the apparatus of FIG. 3.

This stabilization is shown in FIG. 4. Suppose that the frequency $f_1$ of beam 82 drifts upward to frequency $f_1'$, due to, for example, a shock to laser 80. The acousto-optical cell 94 will produce beam 98 with a frequency $f_2$ which will drift up to frequency $f_2'$ with it. The gain cell 100, responding as shown in FIG. 4, moves from operating point 126 to operating point 128 with respect to beam 100, thereby increasing the power of beam 102 from $P_1$ to $P_1'$. With respect to beam 104, the operating point moves from point 130 to point 132, and the power of beam 104 drops from $P_2$ to $P_2'$. First detector 116 therefore produces an increased voltage $V_1$, and second detector 118 therefore produces a reduced voltage $V_2$. This difference in voltages causes the differential amplifier 120 to produce a feedback voltage $V_{FB}$ with both low frequency (including dc) and high frequency components.

$V_{FB}$ is sent via conductor 134 to filter 136, which sends the low frequency components $V_L$ to piezoelectric transducer 84 via conductor 138, and which sends the high frequency components $V_H$ to an electro-optical cell 140 via conductor 142. The piezoelectric transducer 84 and electro-optical cell 140 lengthen the optical path of the laser, thereby driving $f'$ back toward $f_1$ and $f_2'$ back toward $f_2$, as in the apparatus shown in FIG. 1.

As has been noted above, a drift in the frequency $f_1$ of the FIG. 3 laser 80 will be accompanied by a drift in the power of the output beam 82 of that laser 80. This increase in the power of the beam 82 will proportionally increase the power of:

(1) the beam 88 entering the gain cell 100 directly;
(2) the beam 90 entering the acousto-optical cell 94; and
(3) the beam 98 entering the gain cell 164 from the acousto-optical cell 94.

However, this has only an insignificant affect on the operation of the differential amplifier 120, since the differential amplifier 120 drives these power values together very closely, regardless of whether they are large or small on an absolute scale.

Figure 5:
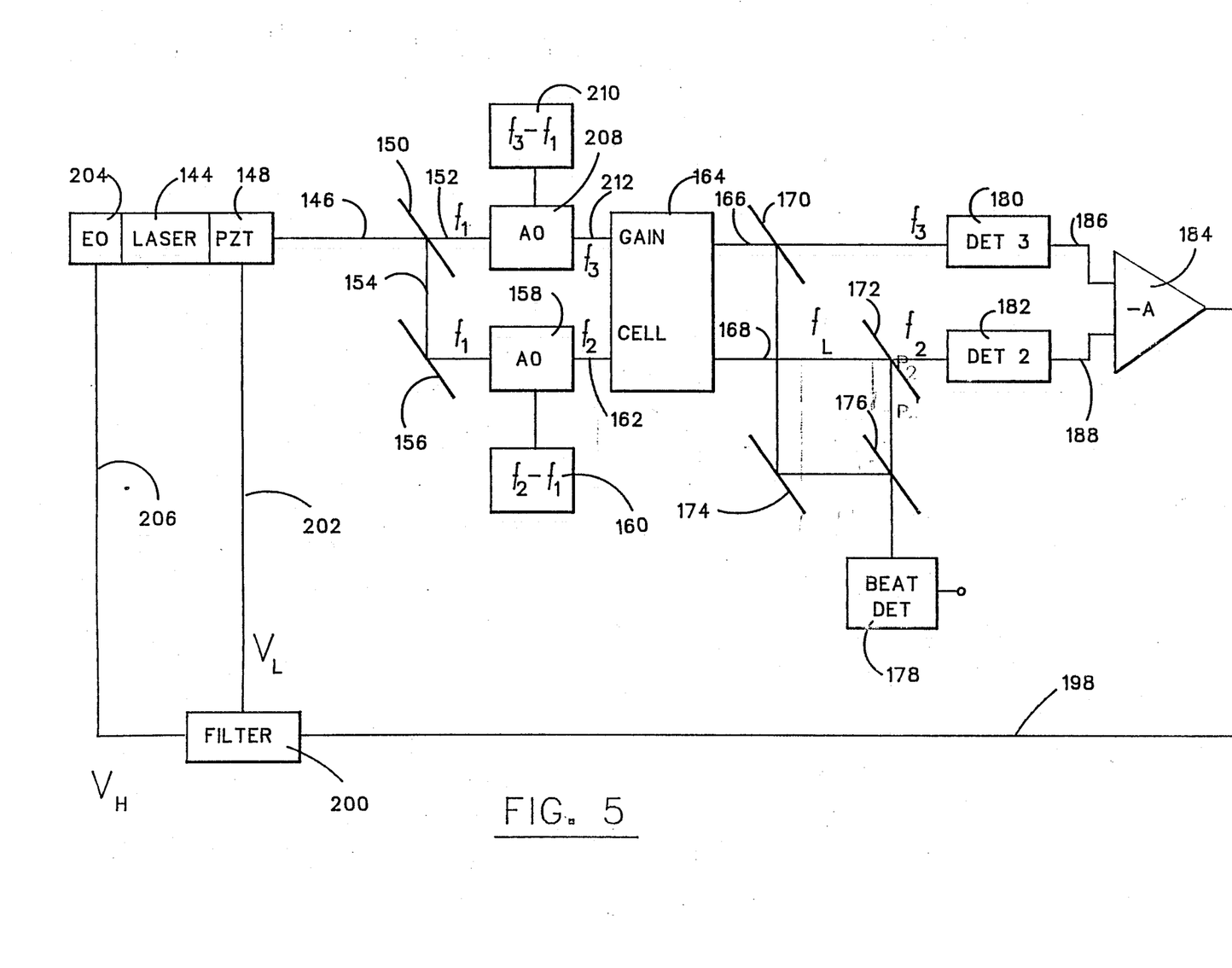
FIG. 5 is a schematic view of a single laser, dual frequency shifter embodiment of the present invention.

A third embodiment of the present invention is shown in FIG. 5. With one exception, each element of the apparatus shown in FIG. 5 is identical to, and operates identically as, the comparable element shown in FIG. 3. With this exception, each element shown in FIG. 5 has been assigned a reference number which is greater by 64 than the reference number assigned to the comparable element of FIG. 3.

The exception is a second frequency shifter, that is, a second acousto-optical cell 208, driven by a second acoustic source 210. The acoustic source 210 has a down-shifted frequency of $f_3-f_1$; that is, the second acousto-optical cell 208 produces a beam 212 with a frequency $f_3$ which is less than $f_1$, while the first acousto-optical cell 158 produces a beam 162 with a frequency $f_2$ which is greater than $f_1$.

Figure 6:
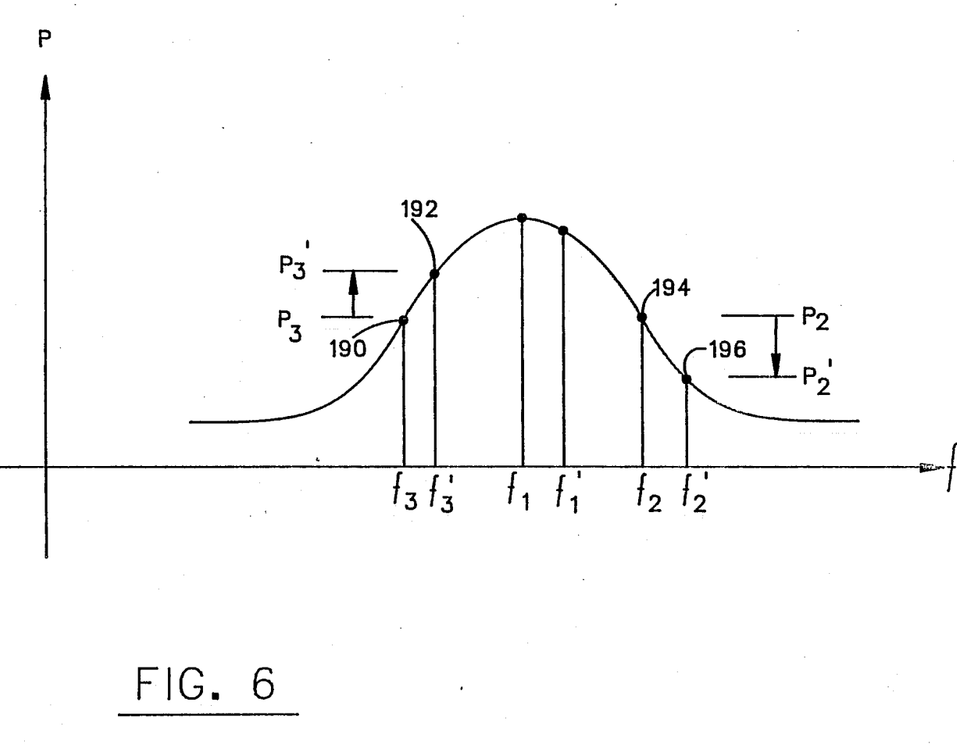
FIG. 6 is an exemplary graph of power versus frequency, showing the operation of the apparatus of FIG. 5.

FIG. 6 is comparable to FIG. 4, except that $f_3$ and $f_3'$ have been substituted for $f_1$ and $f_1'$. $f_1$ is now shown at the peak response frequency of the gain cell 164. In this way, $f_2$ and $f_3$ can be set at the steepest part of their respective sides of the response curve shown in FIG. 6 (or at any other convenient pair of points), and $f_1$ can be set at the peak response frequency (or at any other convenient frequency between $f_2$ and $f_3$).

It is to be noted in FIGS. 5 and 6 that the laser 144 stabilizes at the peak gain frequency of the gain cell 164, and not at its own peak gain frequency unless, of course, the laser 144 and gain cell 164 comprise similar gain media.

The apparatus of FIG. 3 stabilizes on the response curve of the gain cell 100, just as the apparatus of FIG. 5 stabilizes on the response curve of the gain cell 164. While this FIG. 3 stabilization will not take place on the peak of the gain cell 100 (in contrast to the FIG. 5 apparatus, which does stabilize on the peak of the gain cell 164), it will take place around the peak of the gain cell 100, and not around the peak of the laser 80 itself. It is therefore possible to modify the gain medium of the laser 80, the gain cell 100, or both, to such different compositions that one of the frequencies $f_1$ or $f_2$ falling on the sides of the response curve of the gain cell 100 falls at the peak of the response curve of the laser 80. That is, the gain medium of the gain cell 100 may be tuned so that it stabilizes the laser 80 at the peak of the laser 80, even though this will be off the peak of the gain cell 100.

It is, of course, impossible to reverse this tuning with the FIG. 3 apparatus, that is, to tune the apparatus so that the laser 80 operates off its own peak, but on the peak of the gain cell 100. The nature of gain cell stabilization is that one of the output beams of the gain cell 100 must have a frequency above the gain cell peak and another must have a frequency below the gain cell peak. The FIG. 3 apparatus has only two output beams, one of which originated in the laser 80, and the other of which originated in the acousto-optical cell 94. Both such beams must therefore be off the gain cell peak.

It is for this reason that the FIG. 5 apparatus is considered superior to that of FIG. 3. The beams originating in the acousto-optical cells 158 and 208 are the beams off the gain cell peak. The laser 144 may operate at its own peak, and may divert only a small portion of its power into driving the acousto-optical cells 158 and 208. The bulk of its power may be emitted at its own peak frequency, unchanged. If the gain cell 164 has sufficient capacity, the peak frequency beam may also be amplified by it. Alternatively, the peak frequency beam may be amplified by a separate gain cell (not shown), or may be left unamplified.

Figure 7:
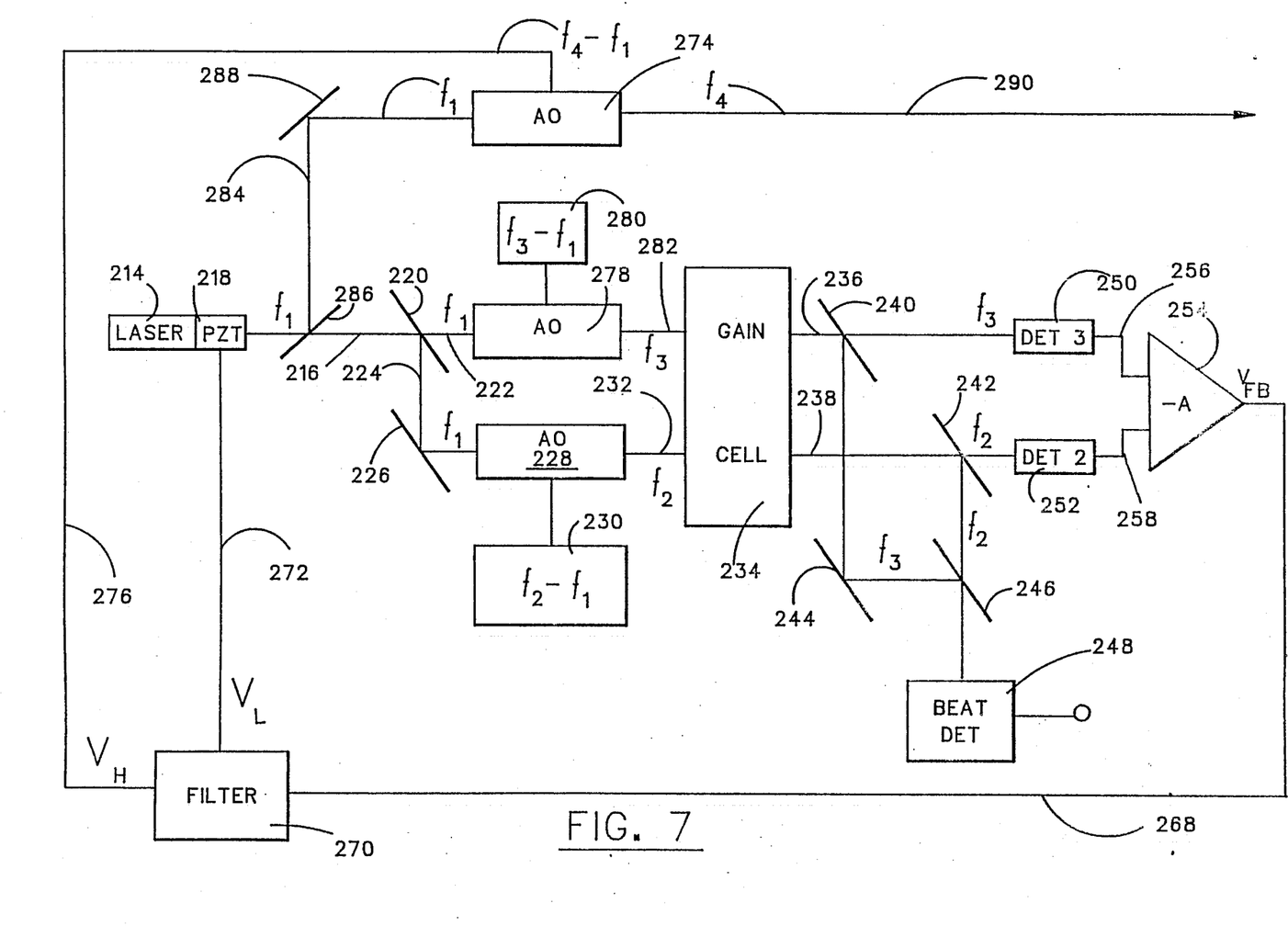
FIG. 7 is a schematic view of a single laser, triple frequency shifter embodiment of the present invention.

A fourth embodiment of the present invention is shown in FIG. 7. With one exception, each element of the apparatus shown in FIG. 7 is identical to, and operates identically as, the comparable element shown in FIG. 5. With this exception, each element shown in FIG. 7 has been assigned a reference number which is greater by 70 than the reference number assigned to the comparable element of FIG. 5.

The exception is the electro-optical cell 204 of FIG. 5. In FIG. 5, this cell modulates the optical length of the laser 144, and thereby modulates the higher frequency components of the fluctuations of the frequency $f_1$ of the beam 146 produced by the laser 144. In FIG. 7, the electro-optical cell 204 of FIG. 5 is replaced by an acousto-optical cell 274, which does not modulate the optical length of the laser 214, but instead modulates a beam of light 284. Light beam 284 is sampled from the output beam 222 by a beam splitter 286, and is reflected into the acousto-optical cell 274 by a mirror 288. Light beam 284 enters the acousto-optical cell 274 with a frequency $f_1$, and leaves the acousto-optical cell 274 as light beam 290, with frequency $f_4$.

It is readily seen that high frequency excursions from the peak frequency may be minimized by the acousto-optical cell 274 acting on the light beam 284 itself (FIG. 7) with an effect comparable to that of the electro-optical cell 204 acting on the laser 144 which produces the light beam 216 (FIG. 5). It is also readily seen that low frequency excursions may also be minimized by modulating the light instead of, or in addition to, modulating the optical length of the laser which produces the light.

In any of the above apparati, it is not required that the gain cell (or, in FIG. 1, the laser pair) have a peak frequency, that is, one at which the intensity of the output light is high, with a rapid fall off in intensity as this peak frequency is varied. Each apparatus operates just as well with a gain cell or laser pair which has a valley frequency, that is, one at which it produces dim light, with a rapid increase in intensity as this valley frequency is varied. The response curve of such a gain cell or laser pair shows an absorption line rather than a gain line.

Figure 8:
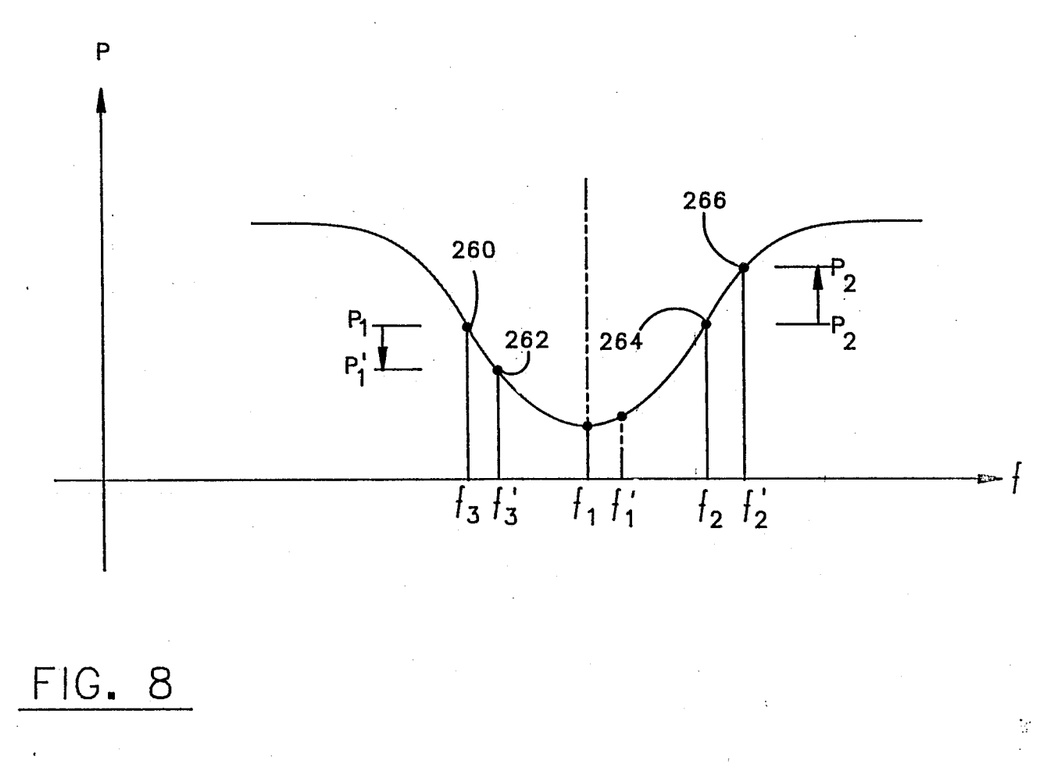
FIG. 8 is an exemplary graph of power versus frequency, showing absorption line rather than gain line operation.

This situation is best shown in FIG. 8, which is comparable to FIG. 6, except that the response curve of FIG. 6 has been inverted. Elements in FIG. 8 have reference numerals which are greater by 70 than the comparable FIG. 6 reference numeral. A frequency drift which, in FIG. 6, would cause the power from one acousto-optical cell to increase and the power from the other to decrease will have the opposite effect in FIG. 8. To maintain negative feedback and consequent active stabilization, it is necessary only to effectively reverse the inputs to the differential amplifiers 60 (FIG. 1), 120 (FIG. 3), 184 (FIG. 5), or 254 (FIG. 7).

What is claimed is:

1. An actively stabilized laser light source comprising:

a higher frequency single mode laser light source which has a higher power-to-frequency response curve, and which is tuned to a higher output frequency, said higher output frequency being higher than a center frequency of said higher response curve;

a lower frequency single mode laser light source which has a lower power-to-frequency response curve, and which is tuned to a lower output frequency, said lower power-to-frequency response curve being at least approximately identical to said higher power-to-frequency response curve, said lower output frequency being lower than a center frequency of said lower response curve, and said higher output frequency differing from said lower output frequency by an at least approximately fixed frequency difference; and means, responsive to a power difference between the power of said single mode sources or to a difference between monotonic functions of said power of said sources, for increasing said higher and lower output frequencies when said power difference has a first sign, and for decreasing said frequencies of said sources when said power difference has a second sign, opposite to said first sign.

2. The source of claim 1 wherein said first sign is positive and said second sign is negative.

3. The source of claim 1 wherein said first sign is negative and said second sign is positive.

4. The source of claim 1 wherein said higher frequency single mode laser light source comprises a higher frequency laser, and wherein said lower frequency single mode laser light source comprises a lower frequency laser.

5. An actively stabilized laser light source comprising:
- a single mode laser producing a first output beam which has a first output frequency and which passes through a first gain cell having a first power-to-frequency response curve having a first center frequency, said first output frequency being on a first side of said first center frequency;
- a frequency shifter driven by a portion of said first output beam and producing a second output beam which has a second output frequency and which passes through a second gain cell having a second power-to-frequency response curve, said second power-to-frequency response curve being at least approximately identical to said first power-to-frequency response curve and having a second center frequency, said second output frequency being on a second side of said second center frequency opposite to said first side, and said second output frequency differing from said first output frequency by an at least approximately fixed frequency difference; and
- means, responsive to a power difference between the power of said gain cells or to a difference between monotonic functions of said power of said cells, for increasing said first and second output frequencies when said power difference has a first sign, and for decreasing said frequencies of said sources when said power difference has a second sign, opposite to said first sign.

6. The source of claim 5 wherein said first sign is positive and said second sign is negative.

7. The source of claim 5 wherein said first sign is negative and said second sign is positive.

8. The source of claim 5, wherein said first gain cell is the same as said second gain cell.

9. The source of claim 5, wherein said first gain cell is different from said second gain cell.

10. An actively stabilized laser light source comprising:
- a higher frequency single mode laser light source which has a higher power-to-frequency response curve, and which is tuned to a higher output frequency, said higher output frequency being higher than a center frequency of said higher response curve;
- a lower frequency single mode laser light source which has a lower power-to-frequency response curve, and which is tuned to a lower output frequency, said lower power-to-frequency response curve being at least approximately identical to said higher power-to-frequency response curve, said lower output frequency being lower than a center frequency of said lower response curve, and said higher output frequency differing from said lower output frequency by an at least approximately fixed frequency difference;
- means, responsive to a power difference between the power of said single mode sources or to a difference between monotonic functions of said power of said sources, for increasing said higher and lower output frequencies when said power difference has a first sign, and for decreasing said frequencies of said sources when said power difference has a second sign, opposite to said first sign; and
- an intermediate frequency single mode laser light source having an intermediate output frequency between said higher output frequency and said lower output frequency, and differing from said higher output frequency or from said lower output frequency by an at least approximately fixed frequency difference.

11. The source of claim 10 wherein:
said intermediate frequency single mode laser light source has an intermediate power-to-frequency response curve; and
said intermediate frequency is at least approximately the same as a center frequency of said intermediate power-to-frequency response curve.

12. The source of claim 10 wherein said first sign is positive and said second sign is negative.

13. The source of claim 10 wherein said first sign is negative and said second sign is positive.

14. The source of claim 10 wherein:
said intermediate frequency single mode laser light source comprises a laser having an optical length; and
said intermediate frequency is stabilized by modulating said optical length of said laser.

15. The source of claim 10 wherein said intermediate frequency single mode laser light source comprises:
a laser; and
means, external to said laser, for stabilizing said intermediate frequency by frequency modulating an output beam produced by said laser.

16. The source of claim 15 wherein said stabilizing means comprises an acousto-optical cell.

* * * * *